United States Patent
Woolard et al.

(10) Patent No.: US 12,552,549 B2
(45) Date of Patent: Feb. 17, 2026

(54) AIRCRAFT GROUND SUPPORT EQUIPMENT GEO-FENCING PROTECTION SYSTEM

(71) Applicants: William Ryan Woolard, Washington, NC (US); David F. Singleton, Washington, NC (US)

(72) Inventors: William Ryan Woolard, Washington, NC (US); David F. Singleton, Washington, NC (US)

(73) Assignee: SERIAS-LEE, LLC, Washington, NC (US)

( * ) Notice: Subject to any disclaimer, the term of this patent is extended or adjusted under 35 U.S.C. 154(b) by 78 days.

(21) Appl. No.: 18/312,396

(22) Filed: May 4, 2023

(65) Prior Publication Data
US 2024/0371281 A1 Nov. 7, 2024

(51) Int. Cl.
| | |
|---|---|
| G08G 5/70 | (2025.01) |
| B64F 1/36 | (2017.01) |
| G08G 5/20 | (2025.01) |
| G08G 5/51 | (2025.01) |

(52) U.S. Cl.
CPC ............... B64F 1/36 (2013.01); G08G 5/20 (2025.01); G08G 5/51 (2025.01); G08G 5/70 (2025.01)

(58) Field of Classification Search
CPC ....... G08G 5/0073; G08G 5/0004; G08G 5/06
See application file for complete search history.

(56) References Cited

U.S. PATENT DOCUMENTS

| | | | |
|---|---|---|---|
| 8,694,238 B2* | 4/2014 | Venkatasubramanian | G08G 5/727 244/50 |
| 9,589,472 B2* | 3/2017 | Resnick | H04W 4/021 |
| 10,761,538 B2* | 9/2020 | Ball | G05D 1/0274 |
| 11,194,052 B1* | 12/2021 | Kazmierczak | G01S 19/215 |
| 11,240,628 B2* | 2/2022 | Jones | H04W 12/64 |
| 11,385,659 B2* | 7/2022 | Levin | G05D 1/683 |
| 11,899,473 B2* | 2/2024 | Levin | G05D 1/683 |
| 11,943,568 B1* | 3/2024 | Wargon | G06V 20/176 |
| 2012/0022727 A1* | 1/2012 | Flanigan | G01C 23/005 701/16 |
| 2013/0184977 A1* | 7/2013 | Venkatasubramanian | G08G 5/51 701/117 |

(Continued)

FOREIGN PATENT DOCUMENTS

JP 6524545 B2 1/2018

*Primary Examiner* — Hoi C Lau
(74) *Attorney, Agent, or Firm* — Russell D. Nugent; Comprising IP

(57) ABSTRACT

A method of preventing aircraft from taking off with ground support equipment installed thereon by detecting the presence of ground support equipment installed on an aircraft using geo-fencing software to define a predetermined area or virtual perimeter around in which aircraft may be operating and using an electronic tracking tag with a positioning device to transmit the location of the tracking tag to a satellite and/or land-based receiver. The satellite and land-based receiver are able to transmit location information to a computer system that then generates an alert. The alert is then transmitted to the pilot or other crew member of the aircraft, the control tower and/or ground support crew or any other entity desired. At that point the person(s) receiving the alert are in a position to take remedial action.

9 Claims, 8 Drawing Sheets

(56) References Cited

U.S. PATENT DOCUMENTS

| | | | | |
|---|---|---|---|---|
| 2016/0075436 | A1* | 3/2016 | Rossano | G06F 3/04847 |
| | | | | 715/771 |
| 2016/0086496 | A1* | 3/2016 | Resnick | H04W 4/021 |
| | | | | 701/120 |
| 2016/0357782 | A1* | 12/2016 | Jones | G06F 16/258 |
| 2016/0358432 | A1* | 12/2016 | Branscomb | G08B 13/19621 |
| 2016/0359986 | A1* | 12/2016 | Jones | H04W 4/021 |
| 2016/0360360 | A1* | 12/2016 | Jones | H04L 67/563 |
| 2018/0267543 | A1* | 9/2018 | McGuire, Jr. | G08G 5/21 |
| 2018/0275654 | A1* | 9/2018 | Merz | G01S 13/933 |
| 2019/0265714 | A1* | 8/2019 | Ball | G05D 1/0217 |
| 2019/0373405 | A1* | 12/2019 | Jones | H04L 61/4511 |
| 2020/0363824 | A1* | 11/2020 | Levin | G01S 13/862 |
| 2021/0034078 | A1* | 2/2021 | Gomez Gutierrez | G08G 5/80 |
| 2022/0044533 | A1* | 2/2022 | Branscomb | H04L 67/12 |
| 2022/0063795 | A1* | 3/2022 | Walter | B64C 13/12 |
| 2023/0082239 | A1* | 3/2023 | Levin | G01S 13/89 |
| | | | | 701/3 |
| 2024/0120989 | A1* | 4/2024 | Navarro | H01Q 1/28 |
| 2024/0142996 | A1* | 5/2024 | Levin | F41G 7/224 |
| 2024/0371281 | A1* | 11/2024 | Woolard | G08G 5/20 |

* cited by examiner

AIRCRAFT GROUND SUPPORT EQUIPMENT GEO-FENCING PROTECTION SYSTEM

BACKGROUND OF THE INVENTION (a) Field of the Invention

The present invention is in the technical field of location-based technologies for safety equipment installed on aircraft. The present disclosure relates to a virtual perimeter system that provides an alert when aircraft are preparing to take flight with Ground Support Equipment (GSE) installed.

(b) Background Art

Modern aircraft necessarily have many sensitive components that must be protected or covered for many reasons when the aircraft is not in use, being stored or being maintained. These components include but are not limited to avionics instrumentation, antennas, drain orifices, engine intakes, engine exhausts, auxiliary power units, vent inlets, wheels, leading edges, grounding lugs, gust locks, air conditioning adapters, and dehumidification adapters. Modern aircraft must also have items installed while on the ground that are not easily seen such as gear pins that prevent the landing gear from collapsing and flight control locks or gust locks. All the above-mentioned items are considered GSE (ground support equipment).

GSE is installed on aircraft between flights for a variety of reasons. Certain sensitive instruments need to be covered while ground crews wash and/or de-ice the outside of the aircraft when necessary. In addition, some airports have such a large problem with certain types of insects and animals, that GSE has to be installed on aircraft when they are on the ground even for short periods of time. For example, Brisbane Airport has had a large problem with wasps nesting in sensitive equipment since 2010 and have had a number of incidents as a result. In one case an aircraft experienced an airspeed discrepancy in the air after having been on the ground for merely an hour. Upon returning to the airport, ground personnel discovered a nest in one of its probes.

The results of GSE being left on an aircraft after the aircraft takes flight are catastrophic. For example, in 1996, an Air Peru 757 crashed into the Pacific Ocean after the ground crew failed to remove tape placed over the static port, a device designed to measure the altitude of the aircraft. The aircraft was photographed on the bottom of the Pacific Ocean with the tape still in place over the static port.

There has long been a problem caused by failure to follow standard operating procedures (SOPs) regarding the installation and removal of GSE from aircraft. Under current SOPs, all aircraft ground support equipment is required to have a warning streamer attached with a written warning printed thereon. Standard operating procedure is to rely on the ground maintenance crew or other ground personnel to remove all GSE prior to the aircraft being able to taxi to the runway. Standard operating procedure also requires the pilot of the aircraft to perform a walk-around inspection of the aircraft prior to entering the cockpit for flight. Both methods rely on one or more human beings to perform a function that in most cases is being performed in a very hectic environment under time pressure. The economic pressures on airlines and airports to move passengers in and out of the airport quickly typically produces a very hectic working environment for ground crews. In addition, ground crews have several other safety issues to attend to just to be present in the area where aircraft are taking off and landing. As a result, there is still a more than minimal chance that GSE is not properly removed from aircraft prior to take-off. Once the pilot is taxiing down the runway, the chances that GSE in place being spotted are virtually none.

BRIEF SUMMARY OF THE INVENTION

The present invention is a method of detecting ground support equipment installed on an aircraft prior to take-off. It takes advantage of geo-fencing technology to notify the control tower and/or pilot when they enter a protected area with GSE installed.

Geo-fences are virtual fences or perimeters placed around physical locations and are used to detect when someone or something enters or leaves the virtual perimeter. Geo-fences are created with software. In addition, geofencing software can send a notification to a user's mobile phone or other device in response to receiving a preset input or signal regarding the location of an object or person. Geo-fences are used by businesses to gather data about their potential customers and to push notifications about offers and sales to them. This process typically requires having a particular application installed on the user's cell phone. Geo-fencing is typically used by marketers and businesses to advertise their products and services.

Currently, geo-fencing technology is used at some airports to control access to the airspace around the airport. Airports have to contend with privately owned drones being flown into the airspace being used by aircraft which can cause collisions and crashes. As a result, Unmanned Aerial Vehicles (UAVs) are now required to have equipment installed that can be detected by an external device that can then send instructions or commands to the UAV to ensure that it stays out of restricted airspace. In this case, information that is typically relayed manually by a flight control tower to an aircraft can automatically be relayed to a UAV flying too close to the airport. However, there is no similar system to alert pilots, flight control crews or air tower control personnel to the presence of GSE on the runway.

More specifically, the present disclosure describes an aircraft ground support equipment geo-fencing protection system. The inventive method utilizes application programming interface software that communicates with an electronic tracking tag installed on or in a piece of ground support equipment via a combination of a satellite-based augmentation system as well as a global navigation satellite system using real time location of the electronic tracking tag. The system can also communicate with an electronic tracking tag via a localized detection method on the ground as a means of a primary or backup alternative. Other versions of the system can use both the land-based receivers and a satellite to receive a signal from the electronic tracking tag.

The present invention is a location based virtual perimeter technology that combines the use of software with a positioning device operably connected to an electronic tracking tag, to trigger a pre-programmed action if the positioning device, installed in or on the GSE enters or exits a virtual perimeter that is established around a geographical location using latitude and longitude coordinates, GPS coordinates, and/or X/Y coordinates. When an electronic tracking tag has entered the virtual perimeter, the position of the electronic tracking tag is detected by software enabled satellites or land-based receivers that then send an alert to a localized receiver that then sends an alert regarding the position of the electronic tracking tag and the GSE to ground support crew, control tower personnel and/or a crew member on the aircraft from which the signal was generated.

The software may be a mobile application, a desktop application, a cloud-based application, or other specific software designed to interpret the signal from the positioning device and alert the control tower, ground personnel, pilot and/or aircraft. The positioning device can be a global positioning device (GPS), radio frequency identification device, RAIN radio frequency identification device, blue tooth low energy device, near field communication device, near field detection device or ultra-wide band device or any other device that is compact enough to be installed in or on GSE. The pre-programmed action is an alert to the control tower, ground personnel, pilot and/or aircraft that the aircraft has GSE installed and has entered the virtual perimeter. The land based receiver may be a physical device or a number of physical devices specifically located to develop an interrogation zone for providing a tightly controlled area. The land based receiver shall be any one or a combination of a PRAT (passive reader active tag) system, ARPT (active reader passive tag) system, or a ARAT (active reader active tag) system or any system of this type that can receive or transmit signals with electronic tracking device or positioning device. The receiver shall be mounted in a manner that provides the best reception based on terrain or geo location and this may be low to the ground or elevated to a specific height.

A preferred embodiment and the inventor's anticipated best mode of the inventive method includes equipping a piece of ground support equipment to be installed on an aircraft with an electronic tracking tag including a positioning device and a first transmitter or a positioning device with a first transmitter integrated into the positioning device. In some embodiments the electronic tracking tag and the positioning device are a single device and in others they are separate devices. The signal transmitted by the first transmitter can be detected by a satellite using or equipped with appropriate software. This may or may not be the same software application that was used to create the virtual perimeter. Once the signal from the positioning device has been detected by the software installed on the satellite, the satellite transmits an alert to a localized receiver. In preferred embodiments, the localized receiver includes a computer system, software and/or a device, such as an antenna, capable of receiving the signal from a satellite or land-based receiver a computer located at the airport, likely in the control tower. In preferred embodiments, a yagi style or similar antenna is used to receive and or transmit the alert(s). In some cases, the localized receiver includes a transmitter to transmit the data it has received to another device. In some embodiments, the localized receiver can be directly accessed by a user, for example if it is installed in a control tower. Regardless of which configuration is used, the alert signals personnel in the control tower, somewhere else at the airport or even on the aircraft that GSE has entered the virtual perimeter. In some embodiments, the localized receiver transmits an alert to ground support personnel in the area and/or the crew of the aircraft from whence the signal derived.

Another preferred embodiment of the inventive method includes localized land-based receivers instead of or in addition to the satellite-based detection system described above. In these embodiments, the land-based receivers can be equipped with software that is used to "build" or define the virtual perimeter. These land-based receivers are also installed with software that allows them to detect and interpret the signal containing location data emitted from the electronic tracking tag and/or positioning device when it enters the pre-defined perimeter. These land-based receivers can be equipped with transmitters to transmit an alert to a computer system or localized receiver in the control tower that GSE is present in the virtual perimeter, just as the satellite in the previously described embodiment. Alternately, the land-based receivers can be operably connected to the localized receiver/computer system or another device somewhere in the vicinity of the airport. This system can be used alone or as a backup to the method described above that involves a satellite.

The inventive method includes equipping one or more pieces of GSE that are being used at a specified airport with electronic tracking tags containing one or more positioning devices. Software will be installed on a computer in the airport's control tower, another location at the airport and/or in the aircraft itself. The control tower or aircraft will be equipped with a specialized antenna array that provides signal, messaging, or data transmission to and from the electronic tracking tag, the control tower and/or the aircraft. In preferred embodiments and the inventors' anticipated best mode of the method, the antenna will need to be able to allow transmission and receipt of radio frequencies in the 1 Watt to 1,000,000 Watt ranges. The operator of the computer system will use the software and/or the land-based receivers to draw a virtual perimeter around single or multiple runways. If a piece of ground support equipment with an electronic tracking tag enters the virtual perimeter, then a signal from the electronic tracking tag will be detected by the satellite and/or the land-based receivers which will then send an alert to the localized receiver (computer) located elsewhere at the airport or on the aircraft itself.

Preferred embodiments and the inventors' anticipated best mode of the inventive method include electronic tracking tags including a positioning device attached in a permanent or temporary fashion inside or on the outside of each piece of ground support equipment. The positioning device can be in a single form or a combination of a passive or active RAIN (Radio frequency Identification) RFID (Radio frequency identification) tag, a passive or active RFID tag, BLE (Bluetooth Low Energy) tag, NFC (near-field communication) tag, and/or UWB (Ultra-wideband) tag. When directly referencing the passive or active RFID tag in a UHF (Ultra high frequency), HF (high frequency) or LF (low frequency) version, preferred embodiments of the tracking tag will communicate with radio frequency transmission waves in a level between 1 Hz to 999 GHz as required to prevent data collisions. Preferred embodiments and the inventor's anticipated best mode of the method include an electronic tracking tag that contains a transmitter capable of transmitting the location data provided by the positioning device to a receiver operated by or operably connected to a processor installed with the geofencing software that detects the location of the electronic tracking tag.

In other versions of the method, aircraft are equipped with a non-electromagnetic storage box in which to store the electronic tracking tag inside the aircraft while blocking the signal produced by the tag, if and when necessary.

The advantages of the present system and method include, but are not limited to providing airports with an automated system to detect when GSE has been left on an aircraft that is about to take off. Preventing this problem from occurring does not depend on fallible human beings that are working in chaotic environments under time pressure. These and other advantages shall be apparent from the detailed description below.

BRIEF DESCRIPTION OF THE SEVERAL VIEWS OF THE DRAWING(S)

DETAILED DESCRIPTION OF THE INVENTION

Figure 1A:
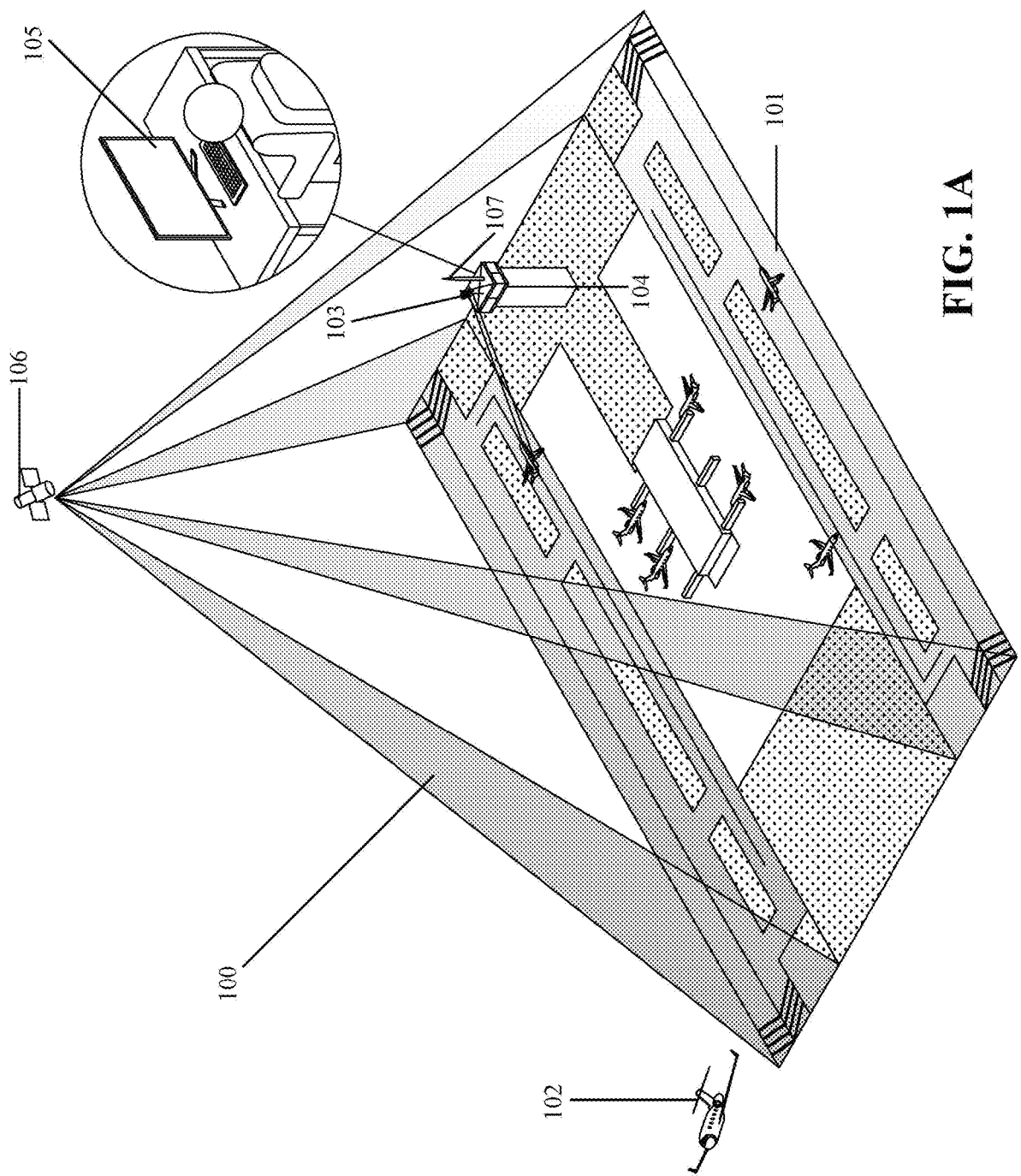
FIG. 1A is a perspective view of an airport at which a first embodiment of the Aircraft Ground Support Equipment Geo-Fencing Protection System is in use.

Referring now to the invention in more detail, FIG. 1A shows a graphic representation of an embodiment of the inventive system/method. FIG. 1A shows a virtual perimeter 100 that has been "drawn" around a predetermined area using software designed for that purpose. In this case, the virtual perimeter 100 has been drawn around runways 101 that will be accessed by departing aircraft 102. In preferred embodiments, the inventor's anticipated best mode and in FIG. 1A, the virtual perimeter includes both the runway 101 and a portion of the airspace above that runway. FIG. 1 goes on to show the localized receiver which includes an antenna array 103 installed on an aircraft control tower 104. The antenna array 103 may include a transmitter, or in the alternate, a transceiver and is capable of detecting the signal from the positioning device (not shown) installed on or inside ground support equipment (not shown) that is installed on aircraft 102 between landing and takeoff. The antenna array 103 receiving the signal is operably connected to the computer system installed with software capable of interpreting the signal. The antenna array may be physically connected to the computer system or may use a transmitter or transceiver to transmit the signal to a computer system 105. The computer system 105 software analyzes a signal generated by the positioning device to determine where that device is located. In preferred embodiments, there is one single software application capable of creating the virtual perimeter 100 and analyzing the signal from the antenna array 103. In other embodiments, these are two separate software applications. FIG. 1A also shows a satellite 106 that, as previously discussed, receives a signal from the positioning device (not shown) and in response, transmits a signal to the localized receiver.

Figure 1B:
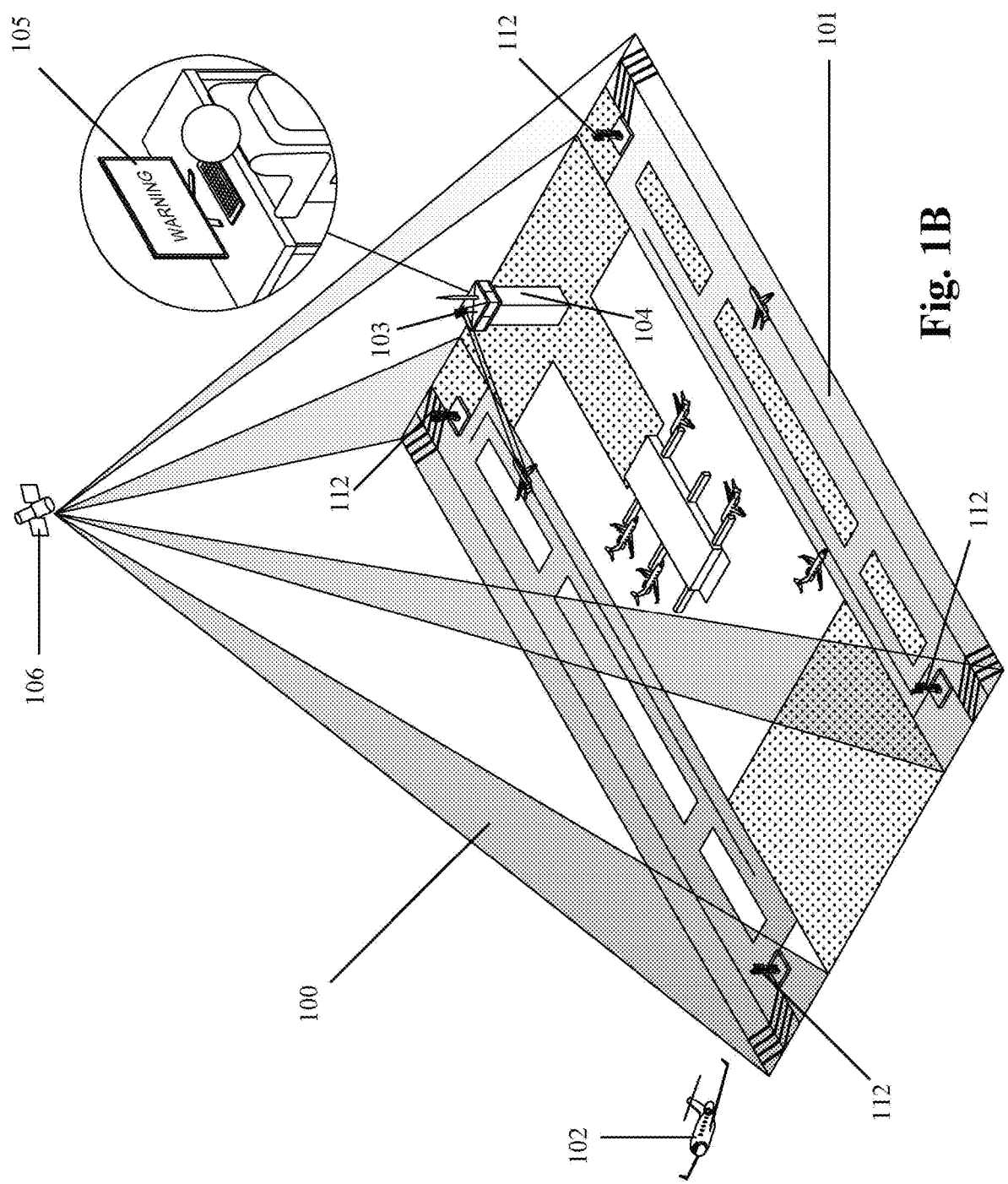
FIG. 1B is a perspective view of an airport at which a second embodiment thereof is in use.

FIG. 1B shows a second general embodiment of the inventive system. FIG. 1B shows the virtual perimeter that has been drawn around more than one runways 101 and some of the airspace above those runways 101. This example still shows the satellite 106 that is capable of detecting the signal from the electronic tracking tag (not shown). In addition, land-based receivers 112 are located proximate to the air control tower 104 and/or the runways 101. In this embodiment, the signal generated by the electronic tracking tag can be received by the satellite 106 and the land-based receivers 112. Other embodiments could include the land-based receivers 112 without a satellite 106 or the land-based receiver 112 may be part of the localized receiver that includes the antenna array 103. Once the signal is sent by either the satellite and/or the land-based receiver(s), the computer system 105 carries out a predefined function or provides an alert. As discussed above, that alert can be sent to any number of different people in a position to take action to prevent the aircraft 102 from taking off.

Figure 2A:
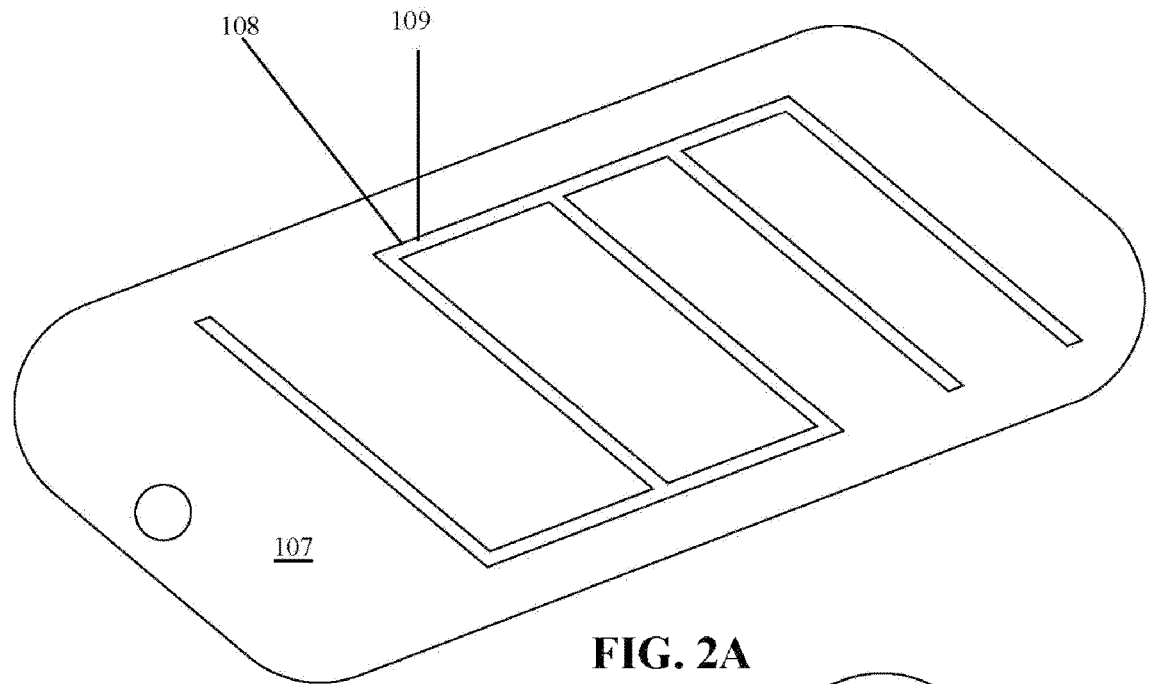
FIG. 2A is a plan view of an electronic tracking tag used therein.
Figure 2B:
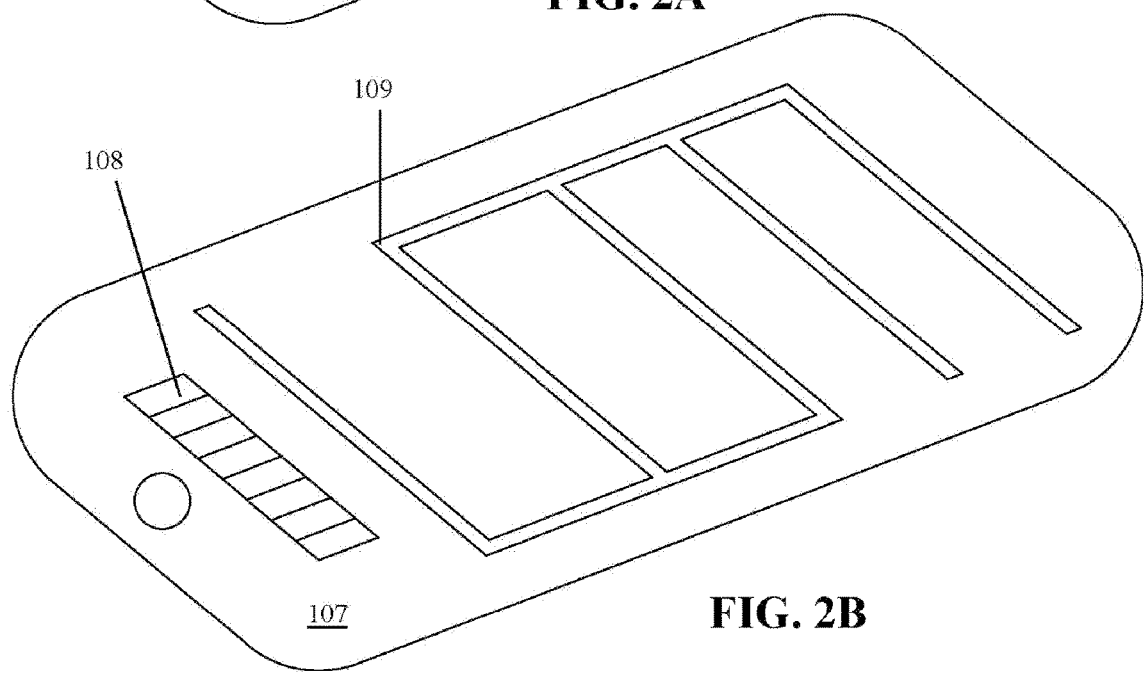
FIG. 2B is a plan view of another embodiment of the electronic tracking tag used therein.

FIGS. 2A and 2B show examples of the electronic tracking tag 107, a positioning device 108 and a transmitter 109. In FIG. 2B, the positioning device 108 and the transmitter 109 are separate structures within the electronic tracking tag 107, but in FIG. 2A, they are combined into one component or device. The electronic tracking tag 107 is installed on any number of pieces of ground support equipment (not shown) like those described above. If the GSE is still installed on the aircraft when it begins to taxi to the runway, the software installed on a land-based receiver and/or satellite that receives positioning information from the electronic tracking tag 107, will generate a signal or an alert that the aircraft is not ready for takeoff as there is still equipment installed that needs to be removed. Once received by the land-based receiver 112, the alert can be translated by a computer system 105. From that data, an automated or manually driven response can be generated.

Figure 3A:
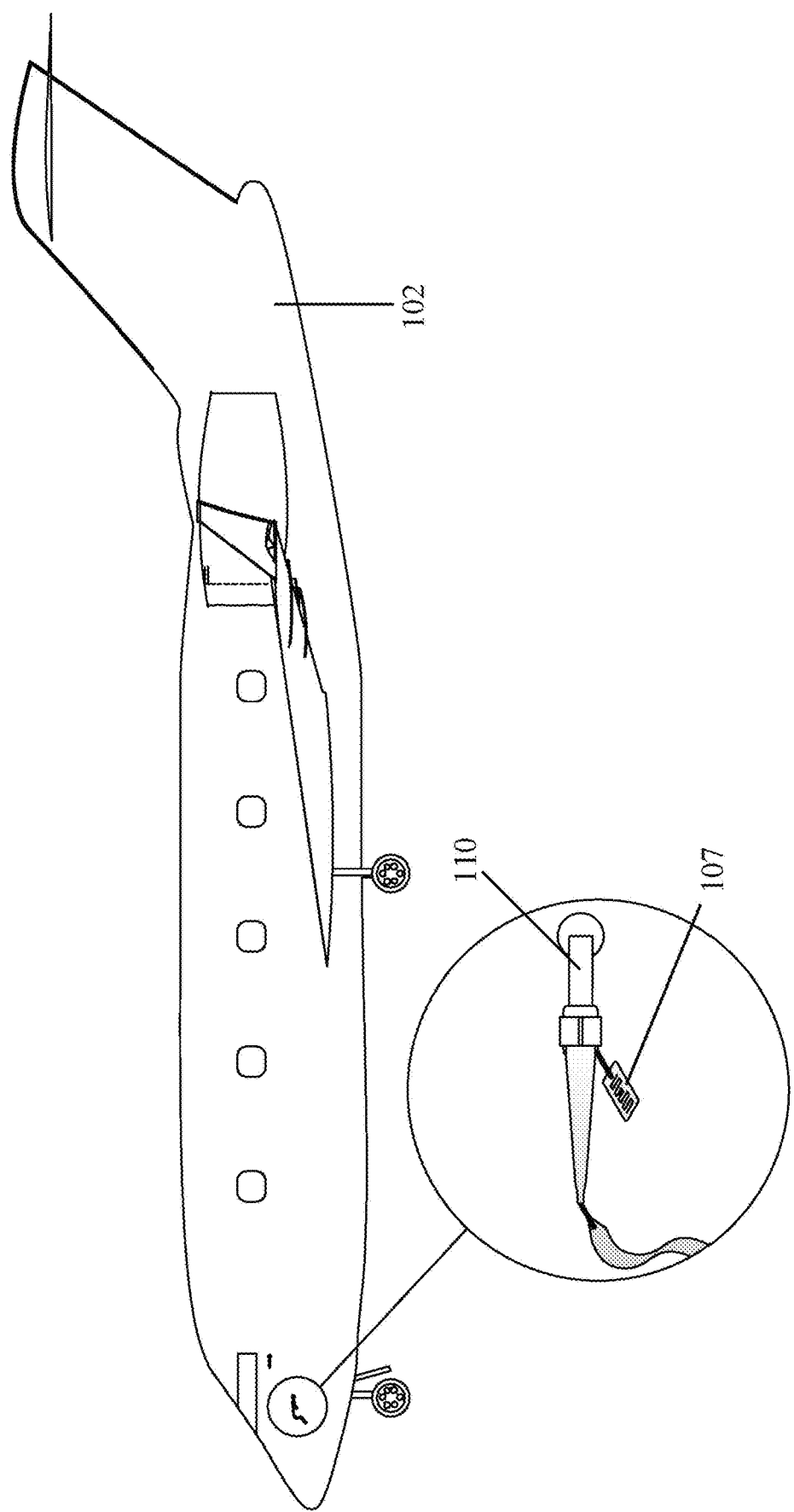
FIG. 3A is a side view of an aircraft with an electronic tracking tag attached to a pitot tube cover.
Figure 3B:
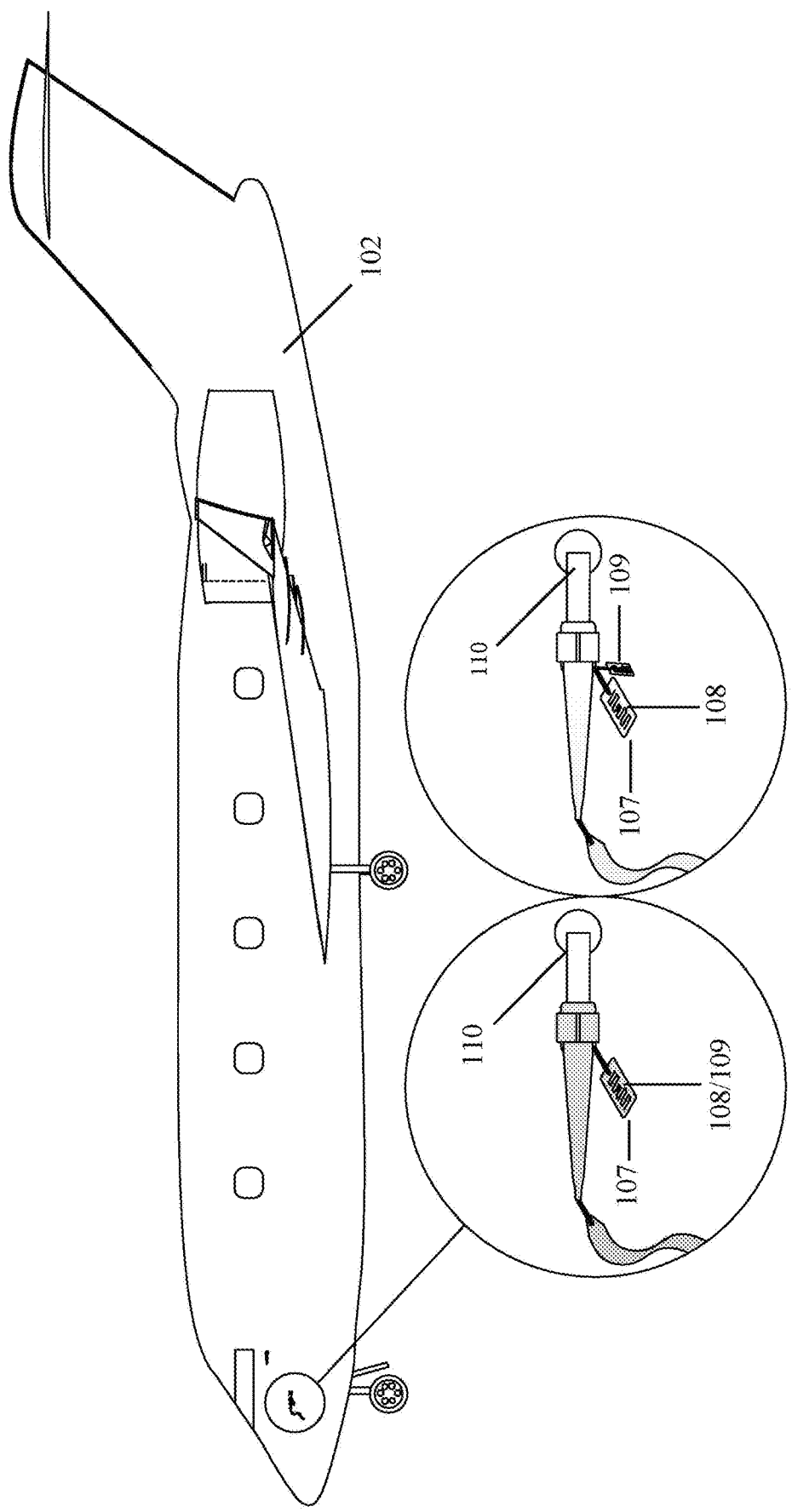
FIG. 3B is a side view of an aircraft with a second and third embodiment of the electronic tracking tag attached to a pitot tube cover.

FIGS. 3A and 3B show an aircraft 102 with a piece of Ground Support Equipment 111 installed over a pitot tube 110 on the outside of the aircraft 102. The GSE 111 has an electronic tracking tag 107 like those described above, attached. In FIG. 3A, the tracking tag, positioning device and transmitter are all integrated together into one tag. In FIG. 3B, the electronic tracking tag 107 with the transmitter 109, is a separate device from the positioning device 108. As explained in detail below, if this aircraft 102 enters the virtual perimeter (not shown), the signal emitted by the positioning device will be transmitted to a satellite (not shown) and/or the land-based receiver(s) (not shown) and then to the localized receiver (not shown).

Figure 4:
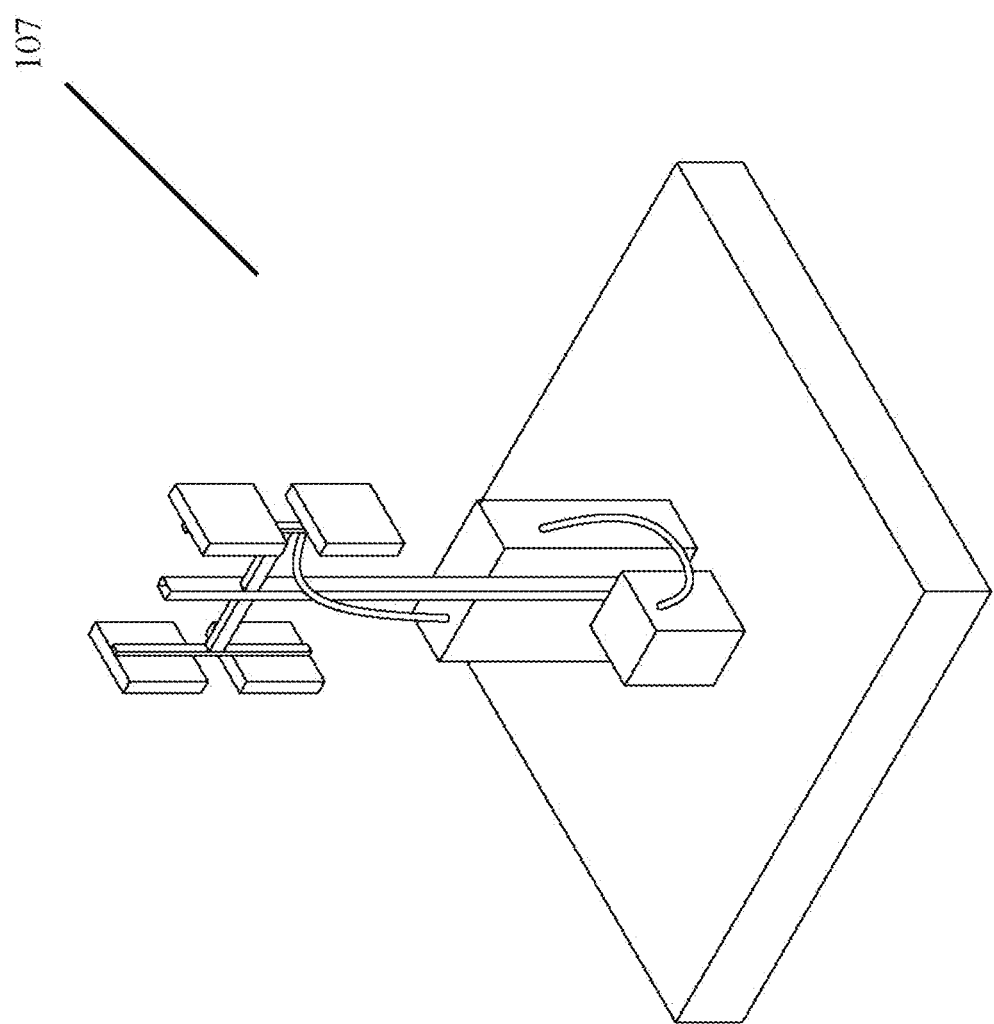
FIG. 4 is a perspective view of a land-based receiver used in some embodiments.

FIG. 4 shows an example of the land-based receiver 112 in isolation. The land based receiver may be a physical device or a number of physical devices specifically positioned to create an interrogation zone, i.e. a zone where the electronic tracking tag 107 and the positioning device 108 can be detected. The land based receiver can be any one or a combination of a PRAT (passive reader active tag) system, ARPT (active reader passive tag) system, or a ARAT (active reader active tag) system or any system of this type that can receive or transmit signals with the electronic tracking tag and/or positioning device. The receiver can be mounted in a manner that provides the best reception based on terrain or geo location and this may be low to the ground or elevated to a specific height.

Figure 5:
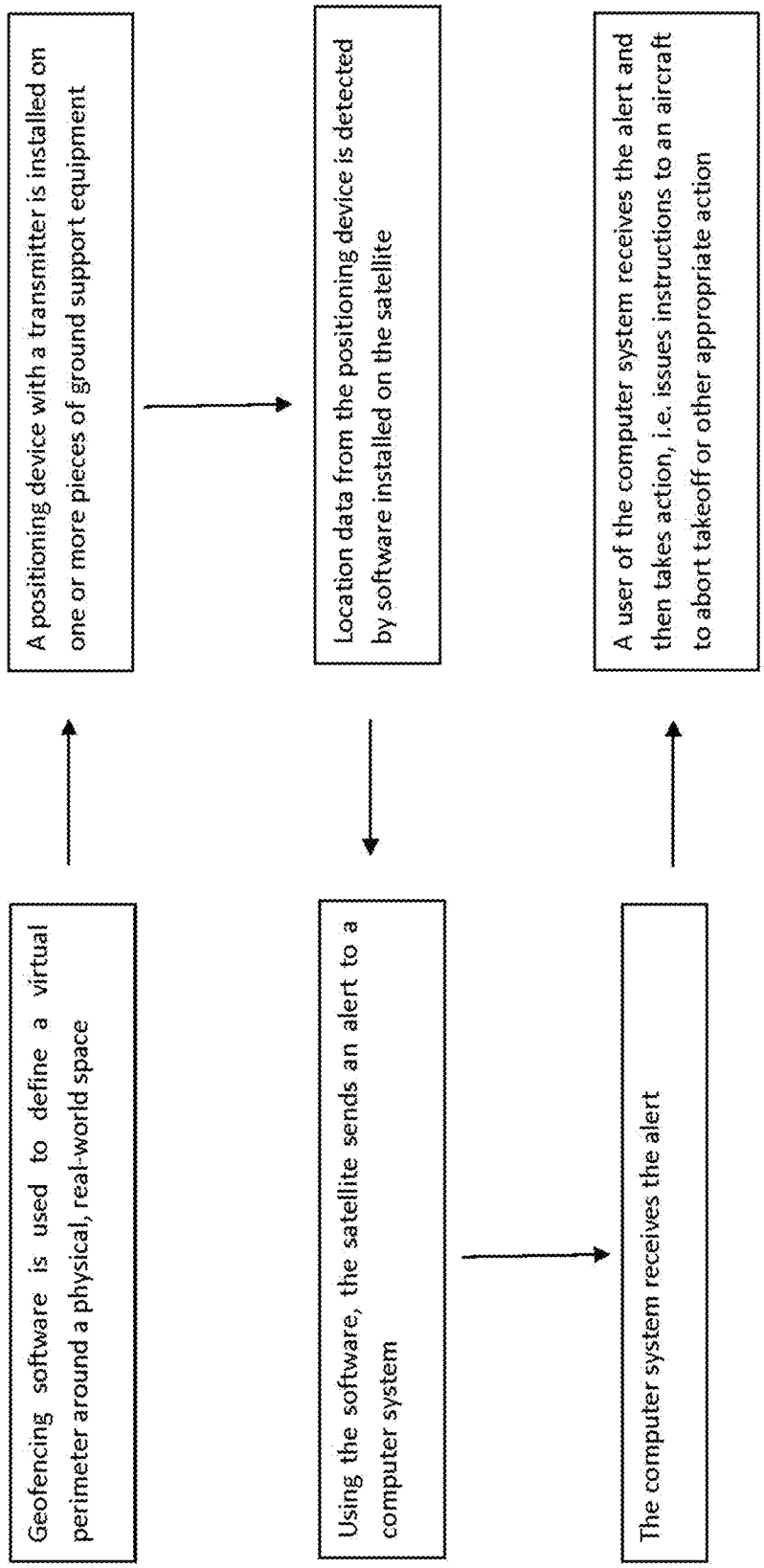
FIG. 5 is a flow chart of a first embodiment of the Aircraft Ground Support Equipment Geo-Fencing Protection System.

FIG. 5 shows a flow chart detailing a preferred embodiment of the inventive method. In this embodiment, geo-fencing software is used to define a virtual perimeter around an area into which an aircraft is expected to travel prior to take-off. This software can be installed on a satellite, a local computer system or other device. In addition, ground support equipment available for use on aircraft are equipped with an electronic tracking tag that includes a first transmitter and a positioning device. As explained above, the positioning device can be any one of or any combination of the following: a global positioning device, a radio frequency identification device, a RAIN radio frequency identification device, a blue tooth low energy device, a near field communication device, a near field detection device or an ultra-wide band device. In addition, the satellite, equipped with software that allows it to interpret a signal, receives the signal transmitted by electronic tag and/or positioning device and sends an alert to a localized receiver. The localized receiver is typically located on the ground near the airport, but need not be. In fact, the localized receiver can be located anywhere as long as it is capable of receiving the signal from the satellite and interpreting the information so received. The localized receiver then generates an alert, which may be as simple as displaying the information that has been received from the satellite or as complex as initiating a cascade of actions that results in someone being alerted of the data detected and transmitted by the satellite. As discussed above, the localized receiver is generally a computer system that is capable of the above functions.

Figure 6:
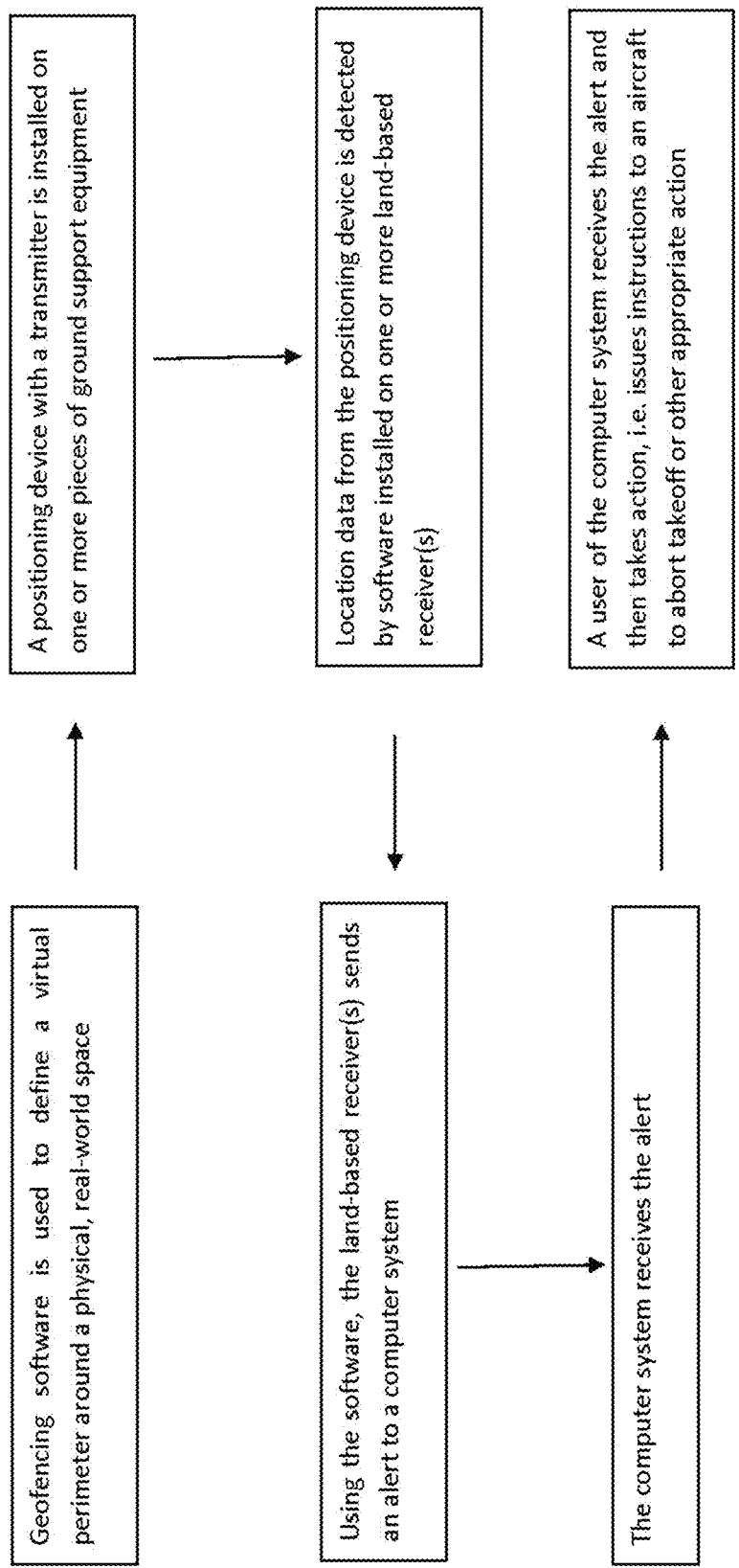
FIG. 6 is a flow chart of a second embodiment thereof.

FIG. 6 is a flow chart that describes a second embodiment of the inventive method. This embodiment replaces the satellite with a land-based receiver. In this embodiment, geo-fencing software is used to define a virtual perimeter around an area into which an aircraft is expected to travel prior to take-off. This software can be installed on a land-based receiver, a local computer system or other device. In addition, ground support equipment available for use on aircraft are equipped with an electronic tracking tag that includes a first transmitter and a positioning device. Software that is installed on one or more land-based receivers analyzes the data received from the positioning device located on a piece of GSE still installed on an aircraft. The location data is then transmitted by the software enabled land-based receiver to a localized receiver, i.e. a computer system that is monitored in some way for this information. Upon receipt of the location data, a user monitoring the computer system can take corrective action. Alternately, the computer system may automatically transmit this information to other locations, including locations where it can ne received by personnel in the aircraft or at the airport.

In broad embodiment, the present invention is a method if ensuring that personnel are alerted to the presence of Ground Support Equipment that is still present on an aircraft prior to takeoff. This system eliminates or augments the current safety checks that are supposed to be performed by ground crews and pilots and eliminates or reduces the human error that is inherent in those safety checks.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above-described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

We claim:

1. A method of detecting ground support equipment installed on an aircraft comprising:
    defining a virtual perimeter around an area into which an aircraft may travel using geo-fencing software;
    equipping the ground support equipment with an electronic tracking tag having a positioning device and a first transmitter;
    transmitting location data from the positioning device to a satellite equipped with software capable of interpreting the location data to detect the presence of the ground support equipment when the ground support equipment enters the virtual perimeter using the first transmitter; and
    providing notification to a localized receiver that the piece of ground support equipment has entered the virtual perimeter by sending a signal from the satellite to the localized receiver that is equipped with software to interpret the signal from the satellite.

2. The method of claim 1 wherein the localized receiver includes a computer system in a control tower.

3. The method of claim 2 further comprising:
    generating an alert with the computer system that the ground support equipment with the positioning device has entered the virtual perimeter.

4. The method of claim 3 further comprising:
    equipping at least one land-based receiver with software capable of receiving and interpreting location data from the first transmitter;
    transmitting location data from the positioning device to the at least one land-based receiver;
    receiving and interpreting the location data when the ground support equipment enters the virtual perimeter using the at least one land-based receiver;
    providing notification to the computer system that the piece of ground support equipment has entered the virtual perimeter by sending a signal from the at least one land-based receiver to the computer system and generating an alert that the ground support equipment with the positioning device has entered the virtual perimeter using the computer system.

5. The method of claim 1 wherein the electronic tracking tag includes a positioning device selected from the group consisting of a global positioning device, a radio frequency identification device, a RAIN radio frequency identification device, a blue tooth low energy device, a near field communication device, a near field detection device or an ultra-wide band device.

6. The method of claim 4 wherein the electronic tracking tag includes a positioning device selected from the group consisting of a global positioning device, a radio frequency identification device, a RAIN radio frequency identification device, a blue tooth low energy device, a near field communication device, a near field detection device or an ultra-wide band device.

7. The method of claim 1 further comprising the step of transmitting the alert to a person in a control tower.

8. The method of claim 1 further comprising the step of transmitting the alert to a crew member of the aircraft.

9. The method of claim 1 further comprising the step of transmitting the alert to a ground crew member.

* * * * *